(12) United States Patent
Choung et al.

(10) Patent No.: US 10,407,259 B2
(45) Date of Patent: Sep. 10, 2019

(54) RAILWAY CARGO DELIVERY SYSTEM

(71) Applicants: Kyung Ho Choung, Seoul (KR); Kyung Hee Lee, Paju-si (KR)

(72) Inventors: Kyung Ho Choung, Seoul (KR); Kyung Hee Lee, Paju-si (KR)

(*) Notice: Subject to any disclaimer, the term of this patent is extended or adjusted under 35 U.S.C. 154(b) by 0 days.

(21) Appl. No.: 16/308,565

(22) PCT Filed: Aug. 30, 2017

(86) PCT No.: PCT/KR2017/009507
§ 371 (c)(1),
(2) Date: Dec. 10, 2018

(87) PCT Pub. No.: WO2018/048138
PCT Pub. Date: Mar. 15, 2018

(65) Prior Publication Data
US 2019/0161293 A1    May 30, 2019

(30) Foreign Application Priority Data

Sep. 9, 2016 (KR) .................. 10-2016-0116600

(51) Int. Cl.
*B65G 67/08* (2006.01)
*B65G 37/00* (2006.01)
(Continued)

(52) U.S. Cl.
CPC ............ *B65G 67/08* (2013.01); *B61D 47/00* (2013.01); *B65B 65/006* (2013.01); *B65G 37/00* (2013.01);
(Continued)

(58) Field of Classification Search
CPC ........ B61D 47/00; B65G 67/02; B65G 67/08; B65G 67/20; B65G 2201/025;
(Continued)

(56) References Cited

U.S. PATENT DOCUMENTS 3,811,579 A * 5/1974 Black ................ B65G 67/02
414/347
3,931,897 A * 1/1976 Bacon ............... B65G 67/08
414/789.8
(Continued)

FOREIGN PATENT DOCUMENTS

JP         07-242143 A    9/1995
JP      2002-347612 A   12/2002
(Continued)

*Primary Examiner* — Mark C Hageman
*Assistant Examiner* — Ashley K Romano
(74) *Attorney, Agent, or Firm* — Im IP Law; C. Andrew Im; Chai Im

(57) ABSTRACT

A system to deliver a cargo using a railway, such as a subway or a national railway, rather than ground transportation. A cargo loading/unloading unit is provided on a platform of a railway station. The cargo loading/unloading unit is configured to load and unload cargoes is provided inside a railway vehicle, such that a large quantity of cargo can be quickly loaded and unloaded while the railway vehicle is stopped at the station. The cargo delivery capacity can also be adjusted, thereby enabling a large quantity of the cargo to be delivered more quickly and conveniently.

5 Claims, 9 Drawing Sheets

(51) Int. Cl.

| | | |
|---|---|---|
| *B65G 67/02* | (2006.01) | |
| *B65G 47/52* | (2006.01) | |
| *B65G 47/76* | (2006.01) | |
| *B65G 67/20* | (2006.01) | |
| *B65B 65/00* | (2006.01) | |
| *B61D 47/00* | (2006.01) | |
| *G06Q 10/06* | (2012.01) | |
| *G06Q 10/08* | (2012.01) | |
| *G06Q 50/28* | (2012.01) | |
| *B65G 47/48* | (2006.01) | |

(52) U.S. Cl.
CPC ......... *B65G 37/005* (2013.01); *B65G 47/482* (2013.01); *B65G 47/52* (2013.01); *B65G 47/76* (2013.01); *B65G 67/02* (2013.01); *G06Q 10/06* (2013.01); *G06Q 10/08* (2013.01); *G06Q 50/28* (2013.01); *B65G 67/20* (2013.01); *B65G 2201/025* (2013.01); *G06Q 10/083* (2013.01)

(58) Field of Classification Search
CPC ...... B65G 47/52; B65G 47/76; B65G 47/482; B65G 37/00; B65G 37/005; G06Q 10/06; G06Q 10/08; G06Q 10/083; G06Q 50/28; B65B 65/006
See application file for complete search history.

(56) References Cited

U.S. PATENT DOCUMENTS

| | | | | |
|---|---|---|---|---|
| 4,479,750 | A * | 10/1984 | Johnson, Jr. ........... | B65G 67/02 254/45 |
| 5,733,092 | A * | 3/1998 | Barry ..................... | B61D 47/00 212/319 |
| 6,619,904 | B1 * | 9/2003 | Barry ..................... | B61D 47/00 414/337 |
| 2003/0228209 | A1* | 12/2003 | Barry ..................... | B60P 1/6436 414/334 |
| 2007/0025832 | A1* | 2/2007 | Rawdon .................. | B64D 9/00 414/401 |
| 2011/0299970 | A1* | 12/2011 | Hathaway ............. | B60J 7/1614 414/809 |
| 2013/0302132 | A1* | 11/2013 | D'Andrea ............. | G06Q 10/08 414/807 |
| 2014/0205403 | A1* | 7/2014 | Criswell ................. | B25J 5/007 414/395 |

FOREIGN PATENT DOCUMENTS

| | | |
|---|---|---|
| JP | 2011-046365 A | 3/2011 |
| KR | 10-2015-0145706 A | 12/2015 |
| KR | 10-2016-0067639 A | 6/2016 |

* cited by examiner

RAILWAY CARGO DELIVERY SYSTEM

RELATED APPLICATIONS

This application is a § 371 application of PCT/KR2017/009507 filed Aug. 30, 2017, which claims priority from Korean Patent Application No. 10-2016-0116600 filed Sep. 9, 2016, each of which is incorporated herein by reference in its entirety.

TECHNICAL FIELD

The present invention relates to a system for delivering cargo using a railway, such as a subway or a national railway, more specifically, to a railway cargo delivery system, which can deliver a large quantity of cargo more quickly and conveniently since the large quantity of cargo can be loaded and unloaded in a speedy way while a railway car is stopped at a station and cargo delivery capacity also can be increased by installing a cargo load and unload unit on the platform of the railway station and providing a cargo stacking unit capable of stacking and unloading a large quantity of cargo inside the railway car.

BACKGROUND OF THE INVENTION

Recently, owing to advancement in electronics and communications techniques, e-commerce methods are greatly activated in the process of trading goods. Since the e-commerce has an advantage of processing a series trading procedures, such as viewing, ordering, paying, delivering and the like of goods, without being affected by location, competition for securing further more consumers through the e-commerce is getting fierce among the manufacturers and distributors, and the volume of traded goods also increases greatly owing to the convenience of the e-commerce.

However, in the process of performing the e-commerce, since the procedure of home delivery and returning goods thereafter should include a process of physically moving an ordered item in practice, in addition to a process managed through the Internet, intervention of a home deliverer between a supplier and a buyer is unavoidable, and the home deliverer at this point generally performs a home delivery work in a method using ground transportation such as a vehicle, a motor cycle or the like.

Since such a cargo delivery method using ground transportation has a lot of difficulties in the delivery work due to poor traffic conditions such as traffic jam in a large city and is very inconvenient in that it requires a long delivery time and cannot accurately estimate the delivery time.

Particularly, as the volume of cargo delivery, such as home delivery, increases furthermore recently due to increase of the e-commerce, a cargo delivery system using ground transportation almost reaches its limit of delivery capability, and a new cargo delivery system is earnestly required.

OBJECT OF THE INVENTION

Technical Problem

The present invention has been made in view of the above problems, and it is an object of the present invention to provide a railway cargo delivery system, as a system for delivering cargo using a railway, such as a subway or a national railway, not ground transportation, which can deliver a large quantity of cargo more quickly and conveniently since the large quantity of cargo can be loaded and unloaded in a speedy way while a railway car is stopped at a station and delivery capacity of the cargo also can be increased by installing a cargo load and unload unit on the platform of the railway station and providing a cargo stacking unit capable of stacking and unloading a large quantity of cargo inside the railway car.

Another object of the present invention is to provide a railway cargo delivery system, which accomplishes smooth delivery of cargo without the problem of increasing a dwell time of a railway car since a speedy loading and unloading work is allowed as a plurality of cargos can be simultaneously loaded on and unloaded from the railway car through a cargo load and unload unit installed on a platform of a railway station.

Still another object of the present invention is to provide a railway cargo delivery system, which can perform delivery of a large quantity of cargo in a speedy and correct way since a work of stacking and quickly loading and unloading the large quantity of cargo is possible as a large quantity of cargo can be stacked in a railway car and the stacking location or the like of the cargo is adjusted considering a route of the railway.

Technical Solution

To accomplish the above objects, according to one aspect of the present invention, there is provided a railway cargo delivery system for delivering cargo to a railway station using a railway, the system comprising: a cargo load and unload unit installed at one side of a platform of the railway station and operating to load and unload the cargo on and from a railway car; a load and unload control unit for controlling operation of the cargo load and unload unit; a cargo stacking unit installed at one side in the railway car to receive and stack the cargo loaded by the cargo load and unload unit and supply the stacked cargo to the cargo load and unload unit so that the stacked cargo may be unloaded by the cargo load and unload unit; and a stacking control unit for controlling operation of the cargo stacking unit, wherein the cargo load and unload unit is formed to dock to the cargo stacking unit, and operation of the cargo load and unload unit is controlled to dock to the cargo stacking unit when the railway car has completely arrived at the platform.

At this point, the cargo load and unload unit may include: a cargo load module for transferring a plurality of delivery-start cargos and simultaneously supplying the cargos to the cargo stacking unit; and a cargo unload module for simultaneously receiving a plurality of delivery-arrive cargos from the cargo stacking unit and transferring the cargos, wherein operation of the cargo load module and the cargo unload module may be controlled to simultaneously dock and operate on the cargo stacking unit.

In addition, the cargo load module may include: a first load transfer unit for sequentially transferring the delivery-start cargos in a first direction of approaching the cargo stacking unit of the railway car; a second load transfer unit for receiving the delivery-start cargos transferred by the first load transfer unit and transferring and arranging the delivery-start cargos in a row in a second direction different from the first direction; a load rolling plate formed to dock to and undock from the cargo stacking unit to receive the plurality of delivery-start cargos arranged in a row in the second load transfer unit and simultaneously transfer and supply the cargos to the cargo stacking unit; and a load shift transfer unit for simultaneously transferring and supplying the plurality of delivery-start cargos arranged in a row in the second load transfer unit to the load rolling plate.

In addition, the cargo unload module may include: an unload rolling plate formed to dock to and undock from the cargo stacking unit to simultaneously receive and transfer a plurality of delivery-arrive cargos from the cargo stacking unit; a second unload transfer unit for receiving the plurality of delivery-arrive cargos transferred by the unload rolling plate and sequentially transferring the cargos in the second direction; a first unload transfer unit for receiving the delivery-arrive cargos transferred by the second unload transfer unit and sequentially transferring the cargos in the first direction; and an unload shift transfer unit for simultaneously transferring and supplying the plurality of delivery-arrive cargos supplied to the unload rolling plate to the second unload transfer unit while the cargos are arranged in a row in the second direction.

In addition, a plurality of rotation rollers may be mounted on the load rolling plate and the unload rolling plate so that the cargos may slide along a transfer direction, and the load rolling plate may be arranged slanting down toward the cargo stacking unit of the railway car, and the unload rolling plate may be arranged slanting up toward the cargo stacking unit.

In addition, the cargo stacking unit may include: a load stacking module for receiving the cargo transferred and supplied from the cargo load module; an unload stacking module arranged in an upper part of the load stacking module to stack cargos to be supplied to the cargo unload module; a stack transfer module for transferring the cargos supplied to the load stacking module to the unload stacking module; and an unload supply module for transferring and supplying the cargos stacked on the unload stacking module to the cargo unload module.

In addition, the cargo stacking unit may further include an intermediate stacking module arranged between the load stacking module and the unload stacking module to stack the cargos, and the stack transfer module may sequentially transfer the cargos of the load stacking module to the intermediate stacking module and the unload stacking module.

In addition, operation of the stack transfer module may be controlled by the stacking control unit to transfer cargos, of which the delivery-arrive point is set to a railway station where the train is going to arrive, among the cargos stacked on the intermediate stacking modules, to the unload stacking module.

In addition, the load stacking module, the unload stacking module, and the intermediate stacking module may be configured such that a plurality of cargo stacking plates capable of stacking cargos may continuously circulate along a circulation path.

In addition, the stack transfer module may include: an elevation support plate formed to accommodate cargos and vertically move along a vertical rail; an elevation driving unit for vertically moving the elevation support plate; and a horizontal transfer means for transferring cargos between the elevation support plate and the cargo stacking plate.

Advantageous Effects

According to the present invention, as a system for delivering cargo using a railway, such as a subway or a national railway, not ground transportation, the railway cargo delivery system has an effect of delivering a large quantity of cargo more quickly and conveniently since the large quantity of cargo can be loaded and unloaded in a speedy way while a railway car is stopped at a station and delivery capacity of the cargo also can be increased by installing a cargo load and unload unit on the platform of the railway station and providing a cargo stacking unit capable of stacking and unloading a large quantity of cargo inside the railway car.

In addition, there is an effect of smoothly delivering cargo without the problem of increasing a dwell time of a railway car since a speedy loading and unloading work is allowed as a plurality of cargos can be simultaneously loaded on and unloaded from the railway car through a cargo load and unload unit installed on a platform of a railway station.

In addition, there is an effect of performing delivery of a large quantity of cargo in a speedy and correct way since a work of stacking and quickly loading and unloading the large quantity of cargo is possible as a large quantity of cargo can be stacked in a railway car and the stacking location or the like of the cargo is adjusted considering a route of the railway.

DESCRIPTION OF SYMBOLS

Figure 1:
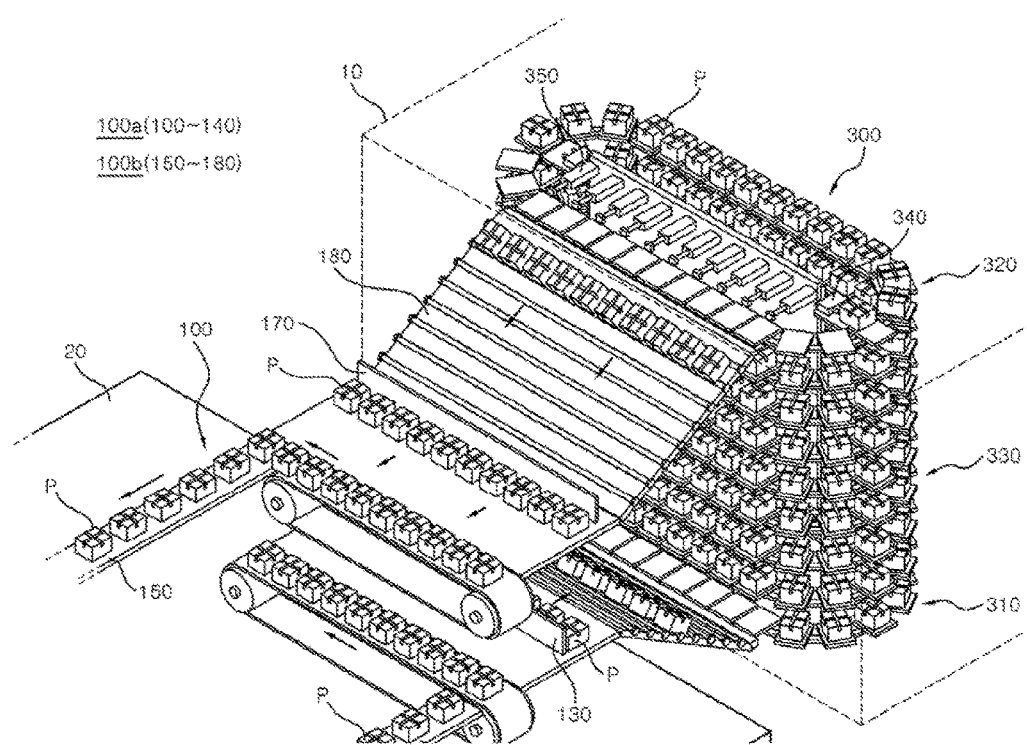
FIG. 1 is a perspective view conceptually showing the overall configuration of a railway cargo delivery system according to an embodiment of the present invention.

10: Railway car
20: Platform
100: Cargo load and unload unit
110: First load transfer unit
120: Second load transfer unit
130: Load shift transfer unit
140: Load rolling plate
150: First unload transfer unit
160: Second unload transfer unit
170: Unload shift transfer unit
180: Unload rolling plate
200: Load and unload control unit
300: Cargo stacking unit
310: Load stacking module
320: Unload stacking module 330: Intermediate stacking module
340: Stack transfer module
350: Unload supply module
400: Stacking control unit

DETAILED DESCRIPTION OF THE EMBODIMENTS

Hereafter, the preferred embodiments of the present invention will be described in detail with reference to the accompanying drawings. First, it should be noted that in assigning reference symbols to constitutional elements of each figure, like symbols will be used for the same constitutional elements wherever possible although they are shown in different figures. In addition, in describing the embodiments of the present invention, if it is determined that specific descriptions about already known configurations or functions related to the present invention may obscure the gist of the present invention, detailed descriptions thereof will be omitted.

FIG. 1 is a perspective view conceptually showing the overall configuration of a railway cargo delivery system according to an embodiment of the present invention.

A railway cargo delivery system according to an embodiment of the present invention is a system for delivering cargo using an electric railway (a concept including all of subways, national railways by setting railway stations as an origin and a destination of delivery and will be generally referred to as a railway), and it includes a cargo load and unload unit 100 for loading and unloading cargo P between a platform 20 and a railway car 10, a load and unload control unit 200 for controlling operation of the cargo load and unload unit 100, a cargo stacking unit 300 arranged inside the railway car to stack the cargo P, and a stacking control unit 400 for controlling operation of the cargo stacking unit 300.

A cargo delivery system using the railway like this may be configured to deliver cargo through a separate control system, which can comprehensively collect delivery information displayed on each cargo P and driving information of the railway car and control and manage the cargo delivery system, and since the cargo delivery control method can be performed in a variety of ways, description thereof will be omitted.

Figure 4:
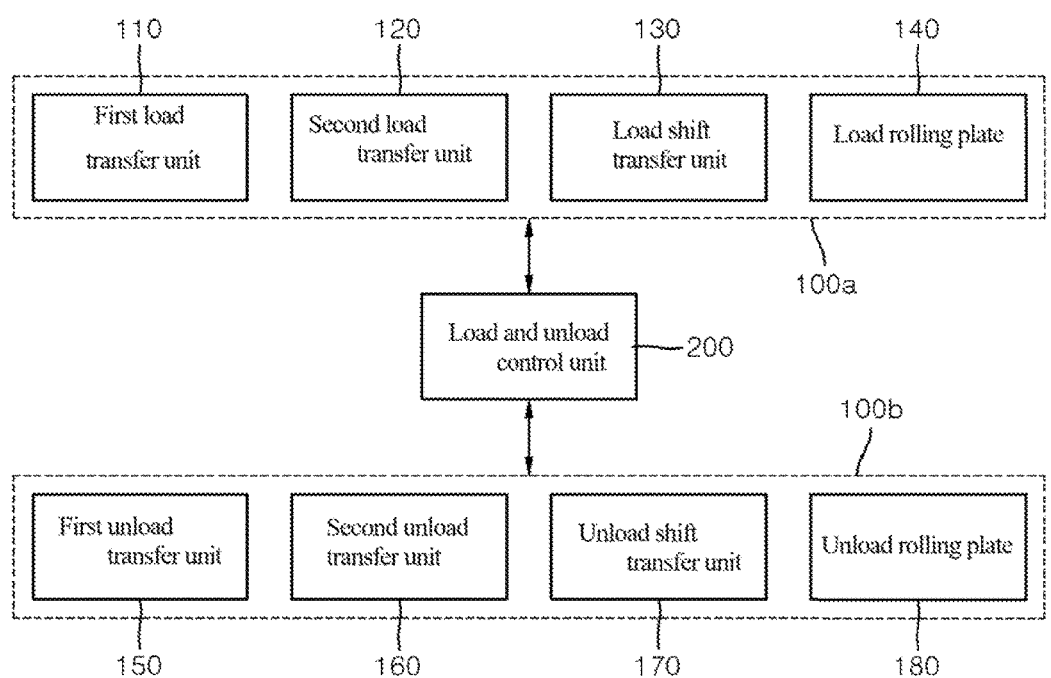
FIG. 4 is a functional block diagram functionally blocking and showing the configuration of a cargo load and unload unit according to an embodiment of the present invention.

The cargo load and unload unit 100 is installed at one side of the platform 20 of a railway station and operates to load and unload cargo P on and from the railway car 10, and the load and unload control unit 200 is configured to control operation of the cargo load and unload unit 100 (see FIG. 4).

The cargo load and unload unit 100 may include a cargo load module 100a for transferring delivery-start cargo P, which starts delivery from a corresponding railway station, and supplying the cargo to the cargo stacking unit 300 installed inside the railway car 10, and a cargo unload module 100b for receiving delivery-arrive cargo P, of which the delivery destination is the corresponding railway station, from the cargo stacking unit 300 of the railway car 10 and transferring the cargo to the platform 20 of the railway station. At this point, the cargo load module 100a and the cargo unload module 100b are configured to simultaneously transfer and supply a plurality of cargos P and thus may load and unload a plurality of cargos P in a speedy way.

According to the structure configured like this, the cargo P starting from a corresponding railway station is automatically loaded on the railway car 10 through the cargo load and unload unit 100, and cargo P, of which the delivery destination is the corresponding railway station, is automatically unloaded from the railway car 10 to the platform 20 of the railway station through the cargo load and unload unit 100.

In addition, the cargo load and unload unit 100 is formed to dock to the cargo stacking unit 300 of the railway car 10, and operation of the cargo load and unload unit 100 is controlled to dock to the cargo stacking unit 300 while the railway car 10 has completely arrived at the platform 20 of the railway station. At this point, the cargo load module 100a and the cargo unload module 100b are controlled to operate after simultaneously docking to the cargo stacking unit 300, and since the loading and unloading works of the cargo P are simultaneously performed through the operation, the loading and unloading works on a large quantity of cargo P can be performed in a speedy way while the railway car 10 stops at the platform 20.

The cargo stacking unit 300 is installed at one side in the inner space of the railway car 10, and it may be formed at a position in the space of a passenger room, or a separate cargo car dedicated for delivery may be additionally connected, and the cargo stacking unit 300 may be installed therein.

Figure 9:
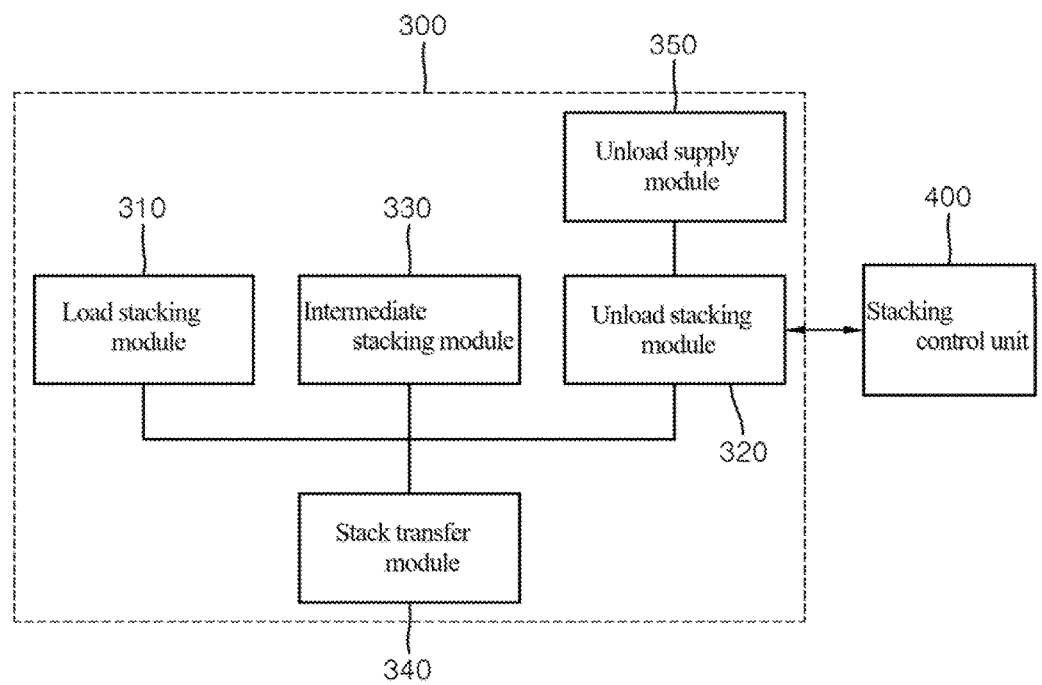
FIG. 9 is a functional block diagram functionally blocking and showing the configuration of a cargo stacking unit according to an embodiment of the present invention.

The cargo stacking unit 300 like this is configured to receive and stack the cargo P loaded from the platform 20 by the cargo load module 100a of the cargo load and unload unit 100 and supply the cargo P stacked in the inner space to the cargo unload module 100b so that the cargo P stacked in the inner space may be unloaded by the cargo unload module 100b of the cargo load and unload unit 100, and the stacking control unit 400 is configured to control operation of the cargo stacking unit 300 (see FIG. 9).

For example, the cargo stacking unit 300 is configured to simultaneously receive a plurality of delivery-start cargos P from the cargo load module 100a, stack the cargos in a separate inner space, and simultaneously supply a plurality of delivery-arrive cargos P, of which the destination is the corresponding railway station, among the plurality of stacked cargos P, to the cargo unload module 100b, and thus a plurality of cargos P can be simultaneously sent to and received from the cargo load and unload unit 100, and the cargo stacking unit 300 may perform the cargo loading and unloading work more quickly.

Figure 2:
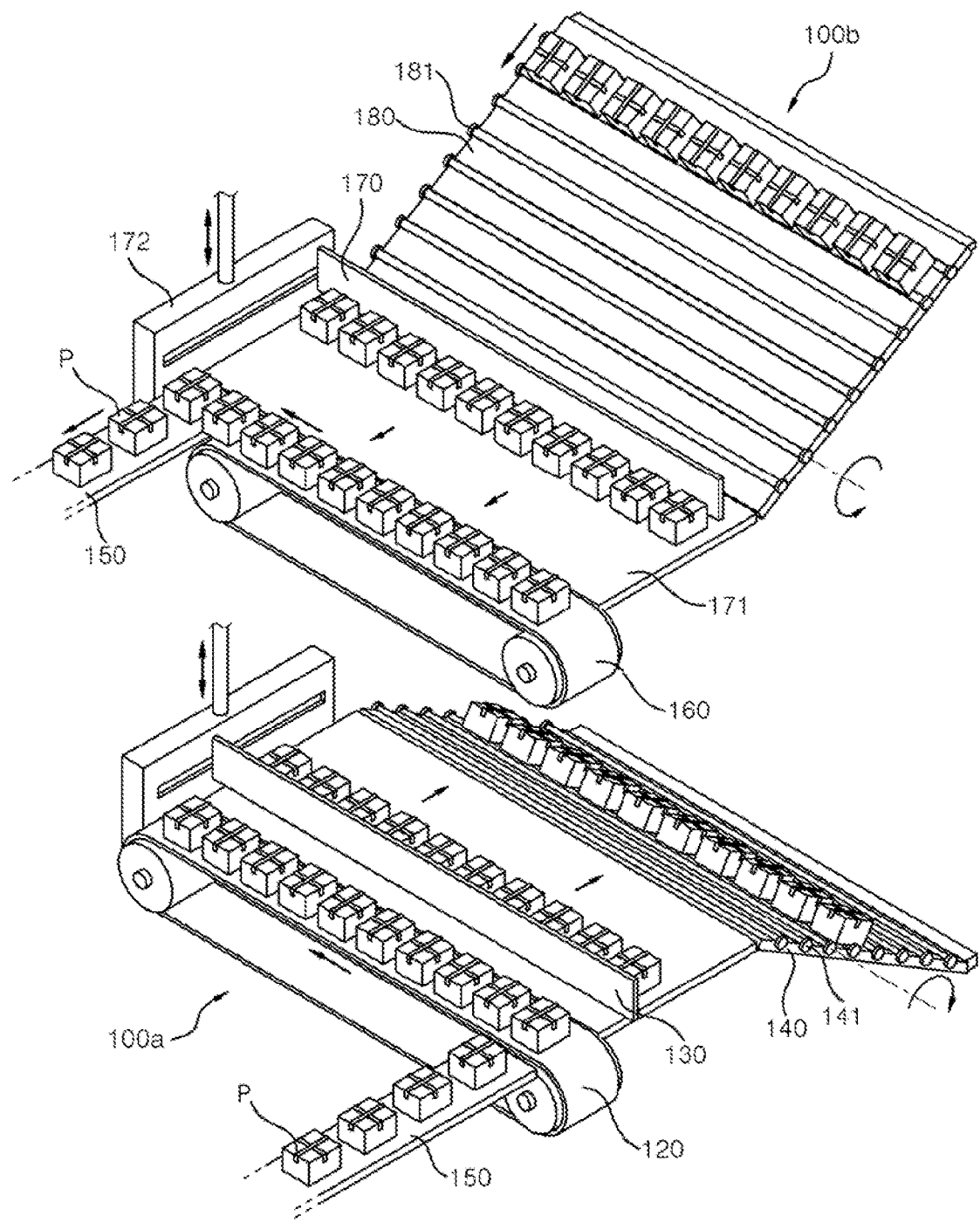
FIG. 2 is a perspective view conceptually showing the configuration of a cargo load and unload unit according to an embodiment of the present invention.
Figure 3:
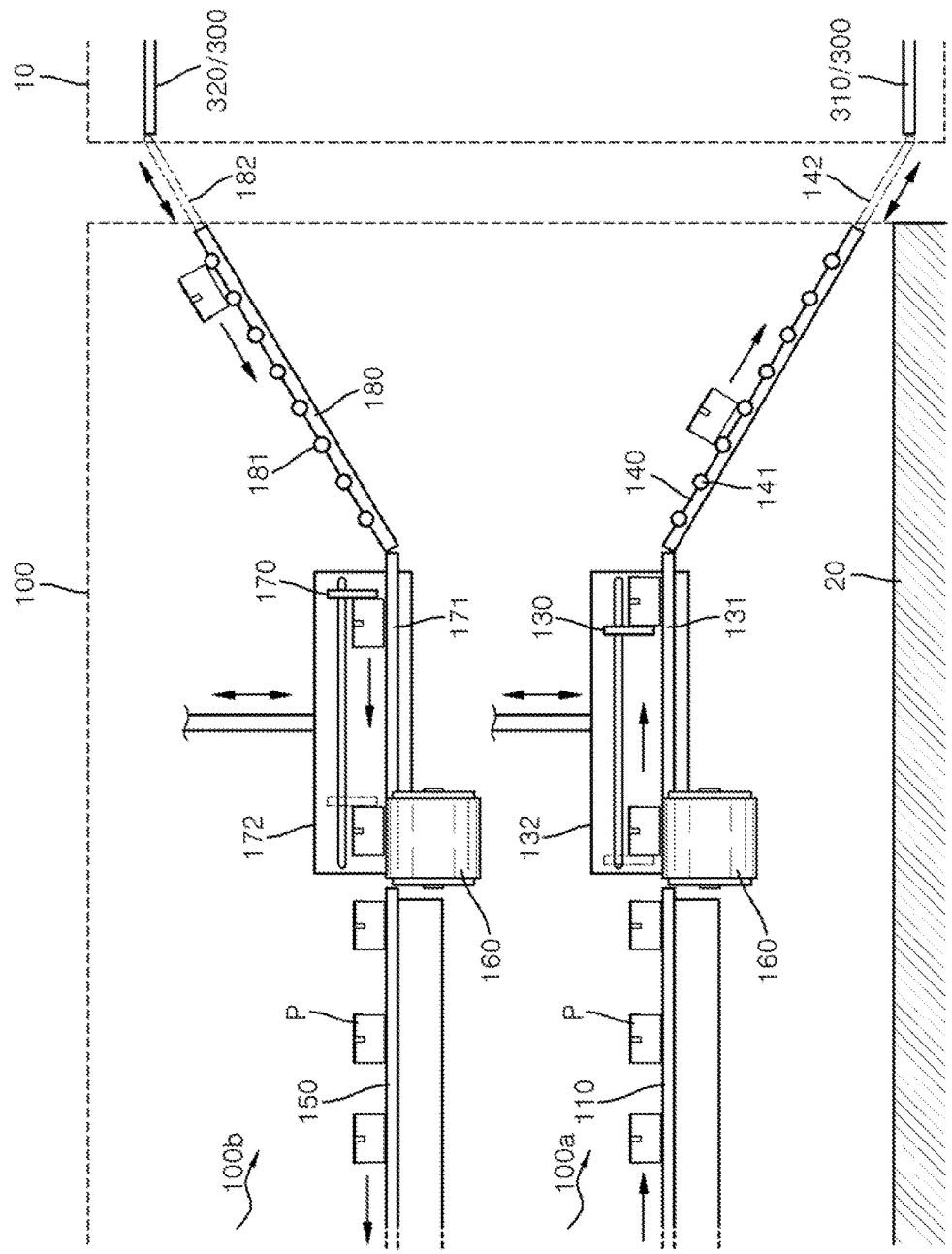
FIG. 3 is a view conceptually showing an operation state of a cargo load and unload unit according to an embodiment of the present invention.

FIG. 2 is a perspective view conceptually showing the configuration of a cargo load and unload unit according to an embodiment of the present invention, FIG. 3 is a view conceptually showing an operation state of a cargo load and unload unit according to an embodiment of the present invention, and FIG. 4 is a functional block diagram functionally blocking and showing the configuration of a cargo load and unload unit according to an embodiment of the present invention.

A cargo load and unload unit 100 according to an embodiment of the present invention includes a cargo load module 100a for loading cargo P on the railway car 10 and a cargo unload module 100b for unloading cargo P from the railway car 10 as described above.

The cargo load module 100a includes: a first load transfer unit 110 for sequentially transferring delivery-start cargos P in a first direction of approaching the cargo stacking unit 300 of the railway car 10, a second load transfer unit 120 for receiving the delivery-start cargos P transferred by the first load transfer unit 110 and transferring and arranging the delivery-start cargos P in a row in a second direction different from the first direction (e.g., in a direction perpendicular to the first direction on the same plane), a load rolling plate 140 formed to dock to and undock from the cargo stacking unit 300 to receive the plurality of delivery-start cargos P arranged in a row in the second load transfer unit 120 and simultaneously transfer and supply the cargos to the cargo stacking unit 300, and a load shift transfer unit 130 for simultaneously transferring and supplying the plurality of delivery-start cargos P arranged in a row in the second load transfer unit 120 to the load rolling plate 140.

The cargo unload module 100b may include: an unload rolling plate 180 formed to dock to and undock from the cargo stacking unit 300 to simultaneously receive and transfer a plurality of delivery-arrive cargos P from the cargo stacking unit 300, a second unload transfer unit 160 for receiving the plurality of delivery-arrive cargos P transferred by the unload rolling plate 180 and sequentially transferring the cargos in the second direction described above, a first unload transfer unit 150 for receiving the delivery-arrive cargos P transferred by the second unload transfer unit 160 and sequentially transferring the cargos in the first direction described above, and an unload shift transfer unit 170 for simultaneously transferring and supplying the plurality of delivery-arrive cargos P supplied to the unload rolling plate 180 to the second unload transfer unit 160 while the cargos are arranged in a row in the second direction.

The first load transfer unit 110, the second load transfer unit 120, the first unload transfer unit 150, and the second unload transfer unit 160 may be configured as a conveyor belt system respectively or may be configured through diverse mechanical devices different from the conveyor belt system. The load shift transfer unit 130 and the unload shift transfer unit 170 may be configured such that a transfer bar formed long in one direction may move in the vertical and horizontal directions by separate driving units 132 and 172 to simultaneously transfer a plurality of cargos P and may be provided with separate transfer plates 131 and 171 to support transfer of the plurality of cargos P in the transfer process.

A plurality of rotation rollers 141 and 181 may be mounted on the load rolling plate 140 and the unload rolling plate 180 so that the cargos P may slide along a transfer direction, and the load rolling plate 140 may be arranged slanting down toward the cargo stacking unit 300 of the railway car 10, and the unload rolling plate 180 may be arranged slanting up toward the cargo stacking unit 300. According to such a configuration, the cargos slide through the load rolling plate 140 to be transferred to the cargo stacking unit 300 in the process of loading the cargos, and the cargos slide through the unload rolling plate 180 to be transferred from the cargo stacking unit 300 to the platform 20 in the process of unloading the cargos.

Meanwhile, separate extension units 142 and 182 that are pulled out or pushed in with respect to the railway car 10 are formed at the end portions of the load rolling plate 140 and the unload rolling plate 180, and the load rolling plate 140 and the unload rolling plate 180 may be docked to the cargo stacking unit 300 in a manner of pulling out the extension units 142 and 182 when the railway car 10 has completely arrived at the platform 20. On the contrary, it may be configured to undock as the extension units 142 and 182 are pushed into the rolling plates 140 and 180.

Figure 5:
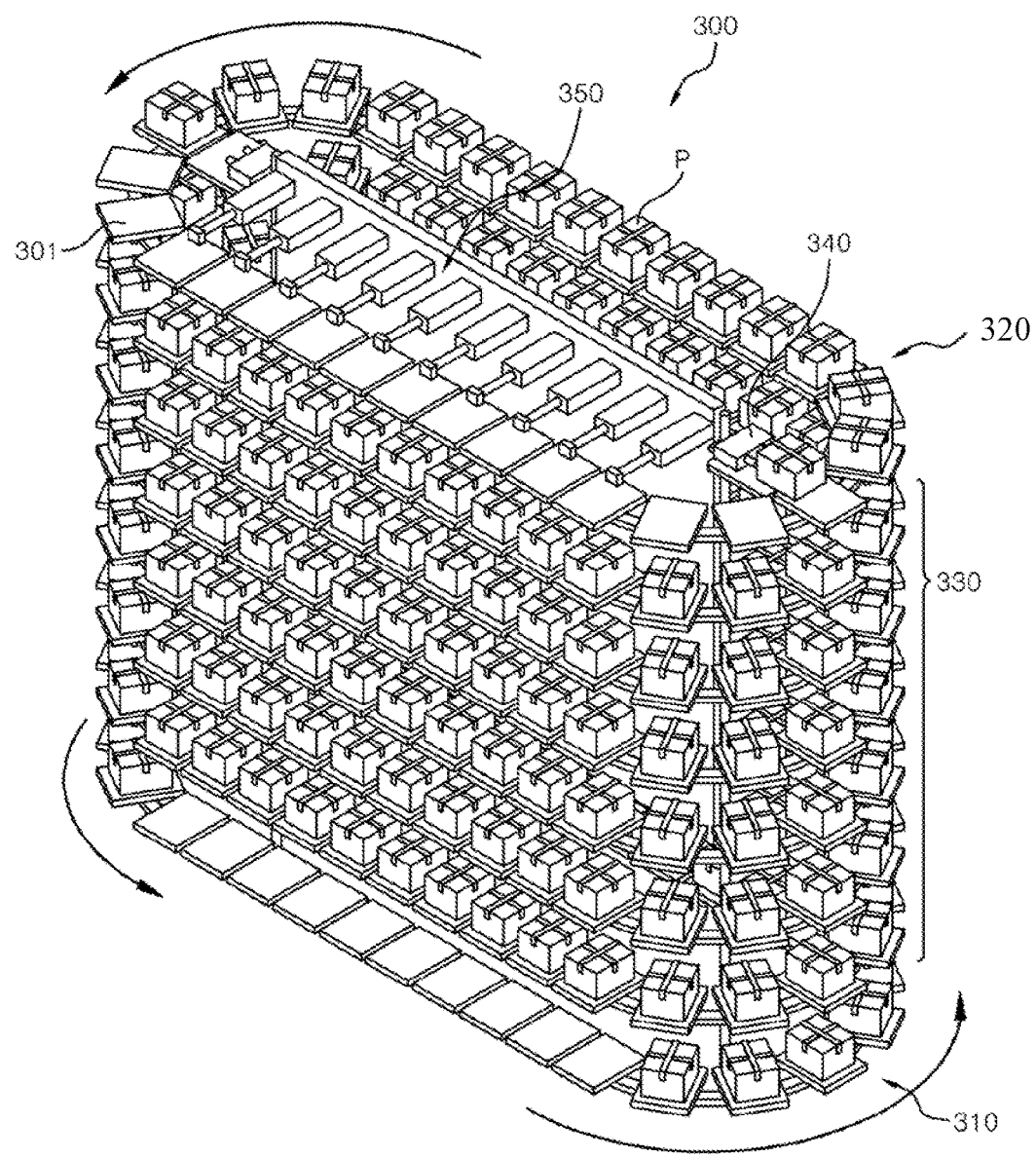
FIG. 5 is a perspective view conceptually showing the configuration of a cargo stacking unit according to an embodiment of the present invention.
Figure 6:
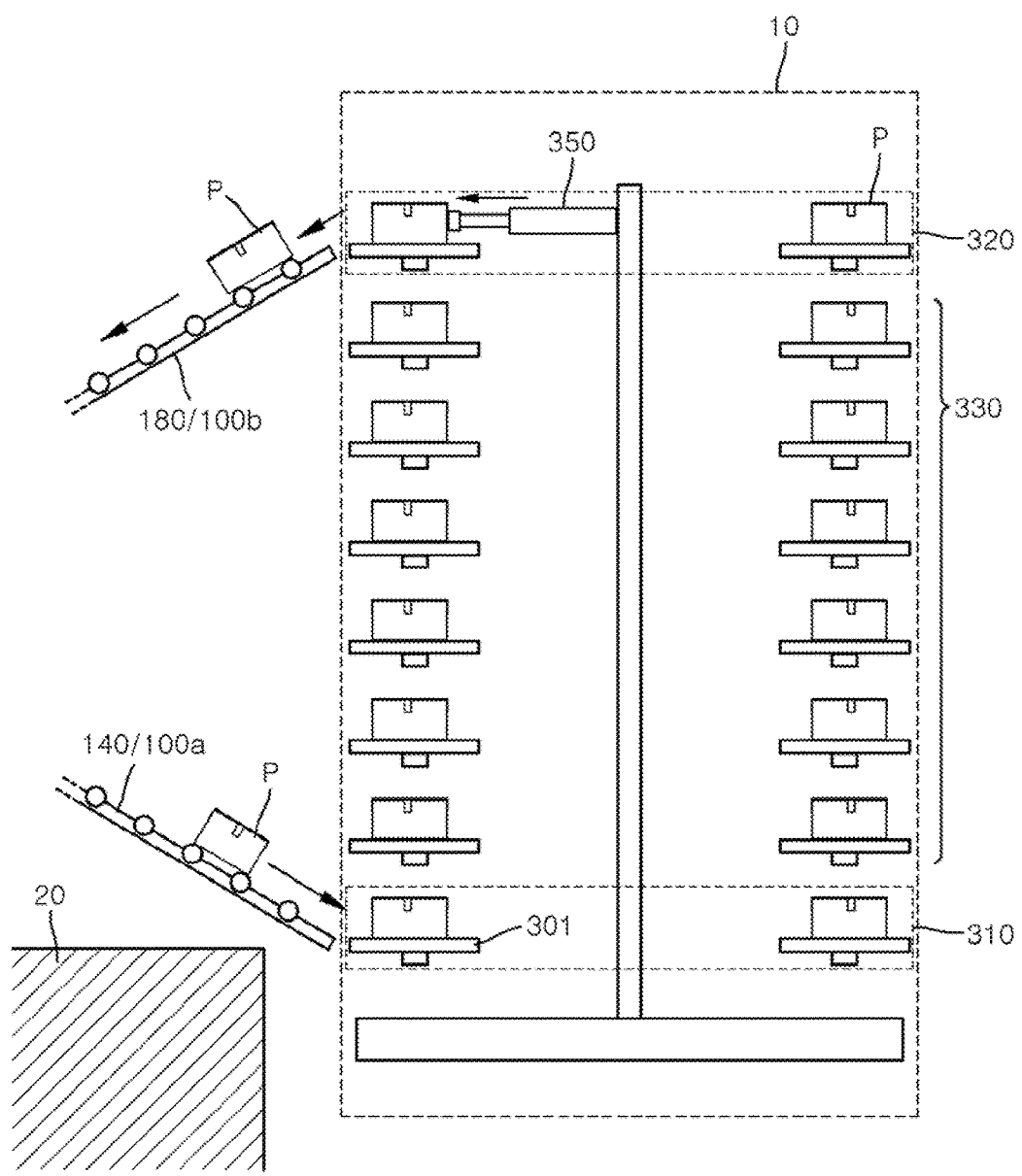
FIG. 6 is a view conceptually showing a loading and unloading operation of a cargo stacking unit according to an embodiment of the present invention.
Figure 7:
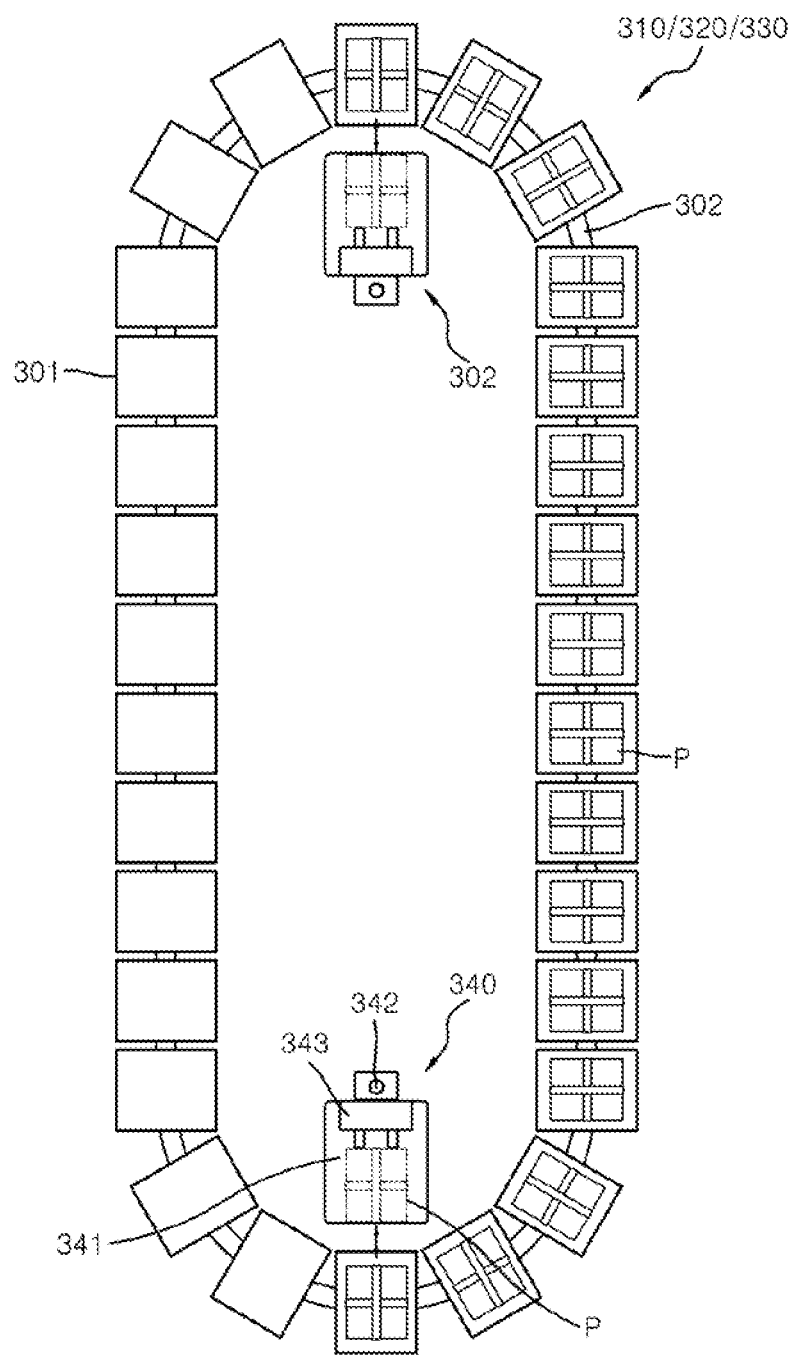
FIG. 7 is a plan view conceptually showing the configuration of a stacking module of a cargo stacking unit according to an embodiment of the present invention.
Figure 8:
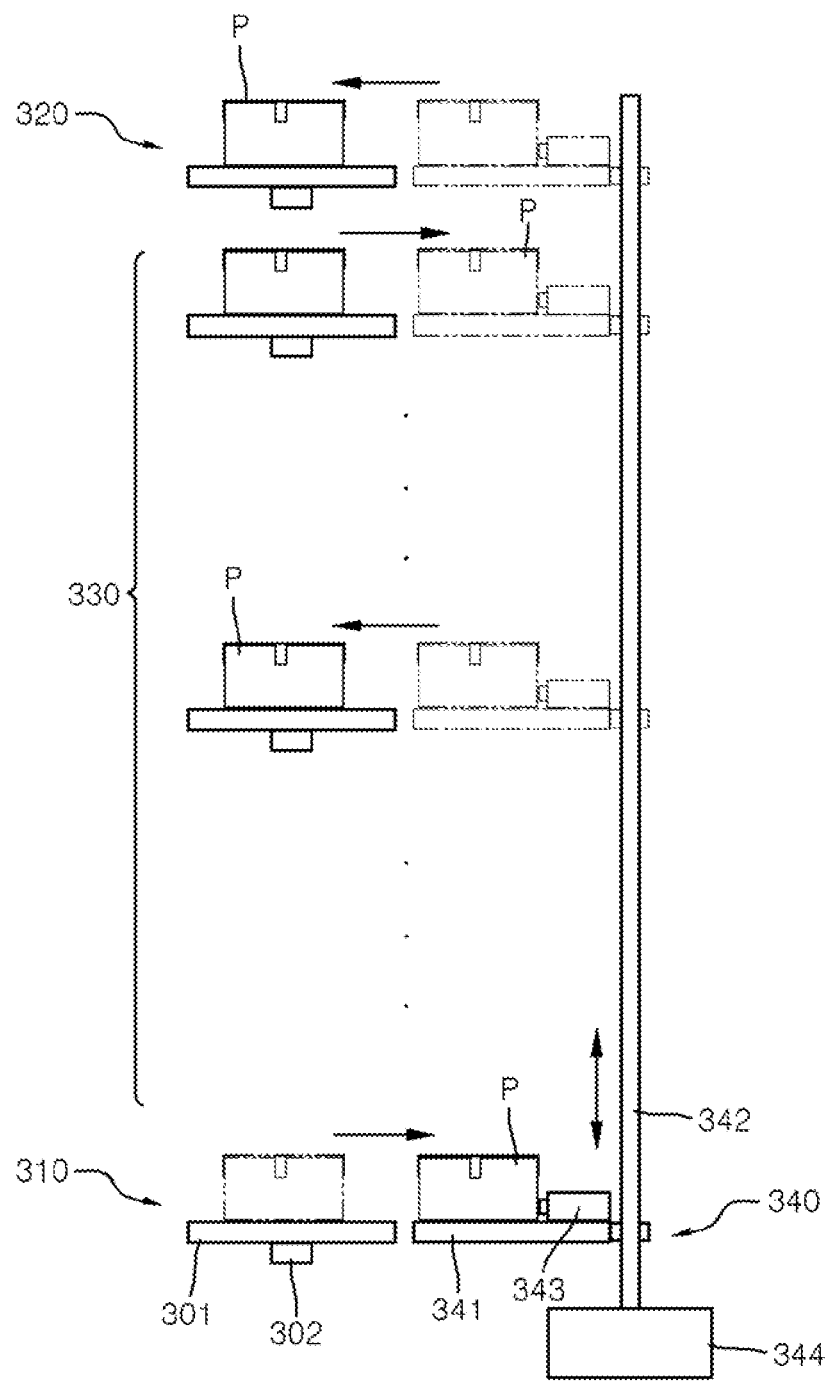
FIG. 8 is a view conceptually showing the configuration of a stack transfer module of a cargo stacking unit according to an embodiment of the present invention.

FIG. 4 is a functional block diagram functionally blocking and showing the configuration of a cargo load and unload unit according to an embodiment of the present invention, FIG. 5 is a perspective view conceptually showing the configuration of a cargo stacking unit according to an embodiment of the present invention, FIG. 6 is a view conceptually showing a loading and unloading operation of a cargo stacking unit according to an embodiment of the present invention, FIG. 7 is a plan view conceptually showing the configuration of a stacking module of a cargo stacking unit according to an embodiment of the present invention, FIG. 8 is a view conceptually showing the configuration of a stack transfer module of a cargo stacking unit according to an embodiment of the present invention, and FIG. 9 is a functional block diagram functionally blocking and showing the configuration of a cargo stacking unit according to an embodiment of the present invention.

The cargo stacking unit 300 according to an embodiment of the present invention may include: a load stacking module 310 for receiving the cargos P transferred and supplied from the cargo load module 100a, an unload stacking module 320 arranged in an upper part of the load stacking module 310 to stack cargos to be supplied to the cargo unload module 100b, a stack transfer module 340 for transferring the cargos supplied to the load stacking module 310 to the unload stacking module 320, and an unload supply module 350 for transferring and supplying the cargos stacked on the unload stacking module 320 to the cargo unload module 100b.

In addition, the cargo stacking unit 300 may further include an intermediate stacking module 330 arranged between the load stacking module 310 and the unload stacking module 320 to stack the cargos P, and operation of the stack transfer module 340 may be controlled to sequentially transfer the cargos P of the load stacking module 310 to the intermediate stacking module 330 and the unload stacking module 320. At this point, the intermediate stacking module 330 may be arranged in plurality to be stacked between the load stacking module 310 and the unload stacking module 320.

At this point, operation of the stack transfer module 340 may be controlled by the stacking control unit 400 to transfer cargos P, of which the delivery-arrive point is set to a railway station where the train is going to arrive, among the cargos P stacked on the intermediate stacking modules 330, to the unload stacking module 320. Particularly, it may be configured to stack the cargos P from the top of the plurality of intermediate stacking modules 330 in an expected unloading order considering delivery-arrive points of the cargos P, a route of the railway and the like.

In this case, a unique number is assigned to each of the load stacking module 310, the unload stacking module 320, and the intermediate stacking module 330 and controlled and managed by the stacking control unit 400, and a position where the cargo P is stacked may be configured to identify the accurate position of a module through the unique number of each module. To this end, an identification code recognition system (not shown) for recognizing an identification code such as a bar code, an RFID or the like registered in the cargo may be further provided in the cargo stacking unit 300. That is, the cargo P moves between the load stacking module 310, the unload stacking module 320, and the intermediate stacking module 330 of the cargo stacking unit 300, and in this case, it may be configured to accurately identify and manage on which module the cargo P is stacked.

As shown in FIG. 7, the load stacking module 310, the unload stacking module 320, and the intermediate stacking module 330 may be configured such that a plurality of cargo stacking plates 301 capable of stacking cargos P may continuously circulate along a circulation path, and the circulation path may be set as a path of an oval shape or configured in the form of a separate guide rail 302.

As shown in FIGS. 7 and 8, the stack transfer module 340 may include: an elevation support plate 341 formed to accommodate cargos and vertically move along a vertical rail 342, an elevation driving unit 344 for vertically moving the elevation support plate 341, and a horizontal transfer means 343 for transferring cargos between the elevation support plate 341 and the cargo stacking plate 301.

Accordingly, a plurality of cargo stacking plates 301 circulates while the load stacking module 310, the unload stacking module 320, and the intermediate stacking module 330 are stacked up and down, and in this state, the stack transfer module 340 may move cargo P to a cargo stacking plate 301, or move cargo P from a cargo stacking plate 301 and move again the cargo to another cargo stacking plate 301 while moving up and down at a point on a side.

That is, since the cargo stacking plates 301 of the load stacking module 310, the unload stacking module 320, and the intermediate stacking module 330 circulate in the horizontal direction and elevation support plate 341 of the stack transfer module 340 vertically moves, if these are combined, the stack transfer module 340 may perform a work of transferring cargo P for all the cargo stacking plates 301 of the load stacking module 310, the unload stacking module 320, and the intermediate stacking module 330.

Meanwhile, the unload supply module 350 is positioned in an upper part of the cargo stacking unit 300 at a location adjacent to the unload stacking module 320 as shown in FIG. 6 and may be configured to supply the cargo P stacked on the unload stacking module 320 to the unload rolling plate 180 in a method of pushing or the like. At this point, the unload supply module 350 may be configured to simultaneously supply a plurality of cargos P to the unload rolling plate 180.

According to the configuration like this, the load stacking module 310, the unload stacking module 320, and the intermediate stacking module 330 are provided in the cargo stacking unit 300 of the railway car 10 and may simultaneously stack a plurality of cargos, and stacking and unloading of a plurality of cargos may be efficiently performed through the stack transfer module 340 and the unload supply module 350, and accordingly, delivery of a large quantity of cargo can be performed in a speedy and correct way.

The spirit of the present invention described above is illustrative purposes only, and those skilled in the art may make various changes and modifications without departing from the intrinsic characteristics of the present invention. Accordingly, the embodiments disclosed in the present invention are not to limit, but to explain the spirit of the present invention, and the scope of the present invention is not limited by these embodiments. The protection scope of the present invention should be interpreted by the appended claims, and all technical spirits within a range the same as that of the present invention should be interpreted as being included in the scope of the present invention.

The invention claimed is:

1. A railway cargo delivery system to deliver a cargo to a railway station using a railway, the system comprising:
   a cargo load/unload unit installed at one side of a platform of the railway station and configured to load and unload the cargo on and from a railway car;
   a load/unload control unit to control operation of the cargo load/unload unit;
   a cargo stacking unit installed at one side in the railway car to receive and stack the cargo loaded by the cargo load/unload unit, and supply the stacked cargo to the cargo load/unload unit so that the stacked cargo is unloadable by the cargo load/unload unit;
   a stacking control unit to control operation of the cargo stacking unit; and
   wherein the cargo load/unload unit is configured to dock to the cargo stacking unit, and wherein the load/unload control unit is configured to operate the cargo load/unload unit to dock to the cargo stacking unit in response to the railway car's complete arrival at the platform;
   wherein the cargo load/unload unit comprises:
     a cargo load module to transfer a plurality of cargos from the platform of the railway station and simultaneously supply the plurality of cargos from the platform of the railway station to the cargo stacking unit;
     a cargo unload module to simultaneously receive and transfer a plurality of cargos from the cargo stacking unit to the platform of the railway station; and
     wherein operation of the cargo load module and the cargo unload module are controlled to simultaneously dock and operate on the cargo stacking unit;
   wherein the cargo stacking unit comprises:
     a load stacking module to receive the plurality of cargos transferred and supplied from the cargo load module;
     an unload stacking module arranged in an upper part of the load stacking module to stack the plurality of cargos to be supplied to the cargo unload module;
     an intermediate stacking module arranged between the load stacking module and the unload stacking module to stack the plurality of cargos;
     a stack transfer module to sequentially transfer the plurality of cargos supplied to the load stacking module to the intermediate stacking module and the unload stacking module for delivery; and
     an unload supply module to transfer and supply the plurality of cargos stacked on the unload stacking module to the cargo unload module;
   wherein the stacking control unit is configured to control the operation of the stack transfer module to transfer cargos having a delivery-arrive point set to an arriving railway station of the railway car from the intermediate stacking module to the unload stacking module; and
   wherein each of the load stacking module, the unload stacking module and the intermediate stacking module comprises a plurality of cargo stacking plates for stacking cargos, the plurality of cargo stacking plates are configured to continuously circulate along a circulation path.

2. The system according to claim 1, wherein the cargo load module comprises:
   a first load transfer unit to sequentially transfer the plurality of cargos from the platform of the railway station in a first direction;
   a second load transfer unit to receive the plurality of cargos transferred by the first load transfer unit and to transfer and arrange the plurality of cargos in a row in a second direction different from the first direction;
   a load rolling plate configured to dock to and undock from the cargo stacking unit to receive the plurality of cargos arranged in the row and simultaneously transfer and supply the plurality of cargos to the cargo stacking unit; and
   a load shift transfer unit to simultaneously transfer and supply the plurality of cargos arranged in the row to the load rolling plate.

3. The system according to claim 2, wherein the cargo unload module comprises:
   an unload rolling plate configured to dock to and undock from the cargo stacking unit to simultaneously receive and transfer a plurality of cargos to the platform of the railway station from the cargo stacking unit;

a second unload transfer unit to receive the plurality of cargos transferred by the unload rolling plate and to sequentially transfer the plurality of cargos in the second direction;
   a first unload transfer unit to receive the plurality of cargos transferred by the second unload transfer unit and to sequentially transfer the plurality of cargos in the first direction; and
   an unload shift transfer unit to simultaneously transfer and supply the plurality of cargos supplied to the unload rolling plate to the second unload transfer unit while the plurality of cargos is arranged in the row in the second direction by the second load transfer unit.

4. The system according to claim 3, further comprising a plurality of rotation rollers is mounted on the load rolling plate and the unload rolling plate so that the cargos slide along a transfer direction; wherein the load rolling plate is arranged slanting down towards the cargo stacking unit of the railway car; and wherein the unload rolling plate is arranged slanting up towards the cargo stacking unit.

5. The system according to claim 1, wherein the stack transfer module comprises:
   an elevation support plate configured to accommodate the plurality of cargos and vertically move along a vertical rail;
   an elevation driving unit to vertically move the elevation support plate; and
   a horizontal transfer unit to transfer the plurality of cargos between the elevation support plate and the cargo stacking plate.

\* \* \* \* \*